United States Patent
Collins-Thompson et al.

(10) Patent No.: US 6,687,697 B2
(45) Date of Patent: Feb. 3, 2004

(54) SYSTEM AND METHOD FOR IMPROVED STRING MATCHING UNDER NOISY CHANNEL CONDITIONS

(75) Inventors: Kevyn Collins-Thompson, Seattle, WA (US); Charles B. Schweizer, Durham, NC (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 09/918,791

(22) Filed: Jul. 30, 2001

(65) Prior Publication Data

US 2003/0028522 A1 Feb. 6, 2003

(51) Int. Cl.[7] ............................................. G06F 17/30
(52) U.S. Cl. .................................... 707/6; 707/5; 707/3
(58) Field of Search ................................. 358/474, 497; 710/1; 707/3, 6, 5; 382/164, 166, 176, 187, 219, 229; 704/260, 269, 276

(56) References Cited

PUBLICATIONS

Myers, G. "A Fast Bit–Vector Algorithm for Approximate String Matching Based on Dynamic Programming," *Lecture Notes in Computer Science*, Issue 1448, 1998, pp. 1–13.

Primary Examiner—Jean M. Corrielus
(74) Attorney, Agent, or Firm—Merchant & Gould P.C.

(57) ABSTRACT

Described is a system and method for improving string matching in a noisy channel environment. The invention provides a method for identifying string candidates and analyzing the probability that the string candidate matches a user-defined string. In one implementation, a find engine receives a query string, converts an image file into a textual file, and identifies each instance of the query string in the textual file. The find engine identifies candidates within the textual file that may match the query string. The find engine refers to a confusion table to help identify whether candidates that are near matches to the query string are actually matches to the query string but for a common recognition error. Candidates meeting a probability threshold are identified as matches to the query string. The invention further provides for analysis options including word heuristics, language models, and OCR confidences.

25 Claims, 8 Drawing Sheets

SYSTEM AND METHOD FOR IMPROVED STRING MATCHING UNDER NOISY CHANNEL CONDITIONS

FIELD OF THE INVENTION

The present invention relates generally to digital images, and more particularly to searching for objects, text or handwriting within a static digital image document, real-time stroke data, or the like.

BACKGROUND OF THE INVENTION

Technology today provides many ways for people to trade electronic documents, such as by disk, e-mail, network file transfers, and the like. In addition, many systems are available that allow a hard copy of a document to be digitized and made electronically available, such as through the use of optical scanners or fax machines. One problem with the digitized version of the document is that the electronic file is typically an image file rather than a textual file, and hence is much more difficult to edit by computer. As important, the image files cannot be electronically searched for instances of a particular text string or other string. Rather, generally, the user is left to manually view the image file representation of the document looking for the desired term. Obviously, this particular method is labor intensive and subject to human error.

Consumer software applications may include an optical character recognition (OCR) component to convert the image file to a textual file. Using OCR applications allows a user to search for particular instances of a query string, however, the confidence of actually finding every instance of that query string may be low. The recognition process occasionally mis-recognizes letters or combinations of letters with similar shapes, causing errors to appear in the resulting text. Typical error rates on a high-quality image can vary widely depending on the complexity of the layout, scan resolution, and the like. On average, for common types of documents, error rates for OCR are often in the range of 1% to 10% of the total characters on the page. These errors greatly diminish the user's confidence of locating every instance of a query string from within a document that started out as an image file. A solution to this problem has eluded those skilled in the art.

SUMMARY OF THE INVENTION

Briefly stated, the present invention provides a system and method for improved string matching within a document created under noisy channel conditions. The invention provides a method for identifying, within a document created by a noisy conversion process (e.g., OCR), potential matches to a user-defined query and the likelihood that the potential matches satisfy the query. Satisfaction can be determined by identifying whether any difference between the potential match and the query is likely the result of an error in generating the document. That identification may be made with reference to a pre-constructed table containing data indicating the probability that a particular error occurred during the noisy document conversion. Additionally, the invention provides optional steps to further assess the likelihood of the match. Such optional steps may include the use of OCR confidence data, word heuristics, language models, and the like.

In one aspect, the invention provides a system for identifying string candidates and analyzing the probability that the string candidate matches a user-defined query string. In one implementation, a document text file is created to represent a document image file through a noisy conversion process, such as OCR. A find engine searches for matches to a query string to within a defined tolerance. Any match that differs from the query string by no more than the defined tolerance is identified as a candidate. The find engine then analyzes the difference between each candidate and the query string to determine if the difference was likely caused by an error in the noisy process. In that determination, reference is made to a confusion table that associates common errors in the noisy process with probabilities that those errors occurred. Candidates meeting a probability threshold are identified as a match. Optionally, this probability threshold may be adjusted by the user to dynamically narrow or widen the scope of possible matches returned by the find engine. The invention further provides for analysis options including word heuristics, language models, and OCR confidences.

In another aspect, the invention may be implemented as a computer-readable medium, having computer executable-instructions for performing steps including receiving a query string request to locate every instance of the query string in a document image file, converting the document image file into a document text file, parsing the document text file to identify data strings that may be the query string, and analyzing the data strings to identify a probability that each of the data strings is the query string.

DETAILED DESCRIPTION OF THE PREFERRED EMBODIMENT

The present invention provides a system and method for locating data described by a query from within a document where the document was derived from a noisy process, such as optical character recognition (OCR), handwriting recognition, or the like. Among other things, disclosed is a protocol designed to organize string matching and noisy channel cost analysis of text received via optical character recognition (OCR). The protocol allows text generated through OCR to be parsed, analyzed to remove noise effects due to transmission, and optionally analyzed to counter adverse effects of the OCR process.

Illustrative Operating Environment

Figure 1:
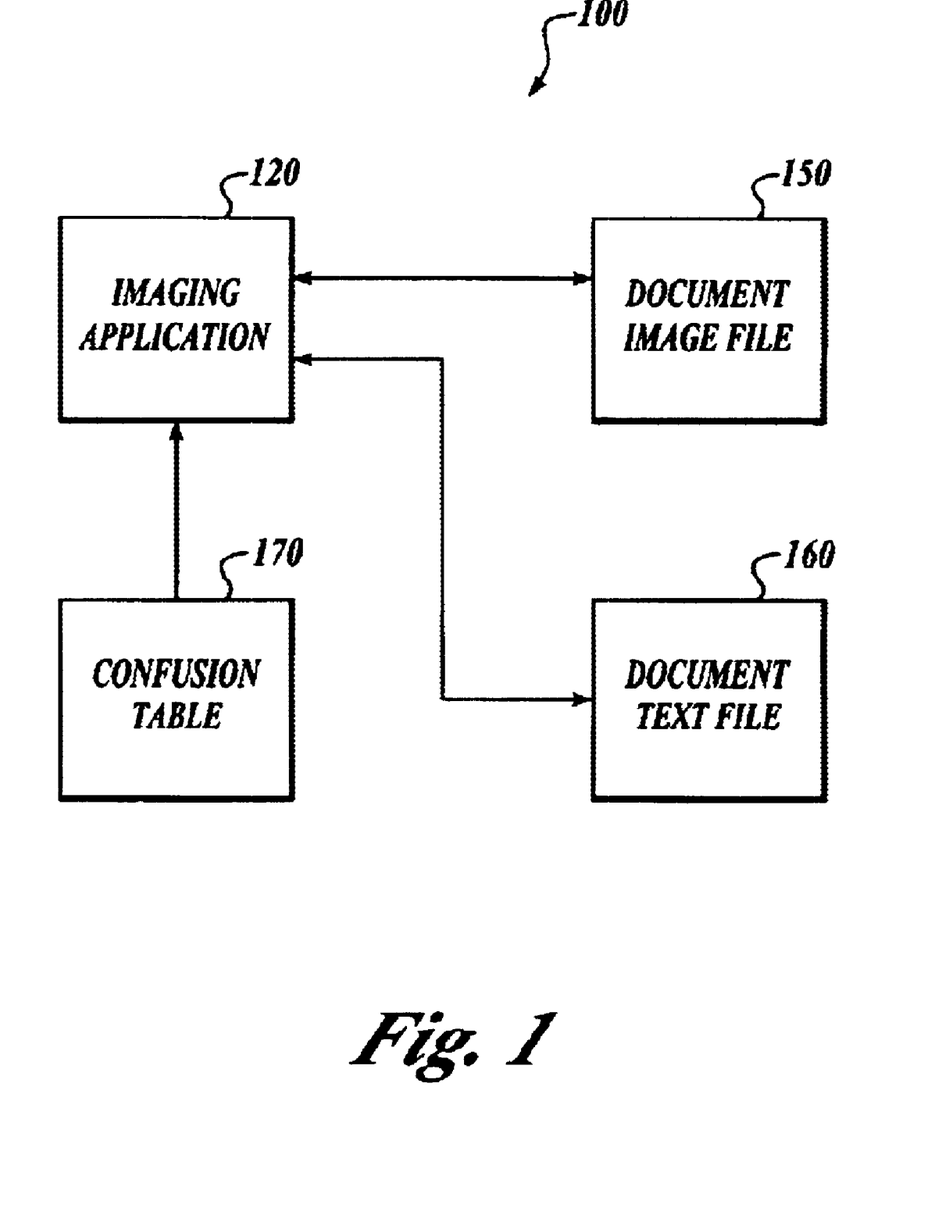
FIG. 1 is a functional block diagram illustrating a system adapted to receive a image and locate a query string within the image, in accordance with one implementation of the present invention.

FIG. 1 is a functional block diagram illustrating a system 100 adapted to receive a document image file 150 and locate a query string within the document image file 150. The system 100 includes an imaging application 120, a document image file 150, a document text file 160, and a confusion table 170.

Document image file 150 may be a picture or other graphical image, such as bit-mapped text or the like. In one embodiment, the document image file 150 may be a tagged image file format, a portable document file format, or the like. The document image file 150 may be the result of having scanned in a hard copy of a textual document, an electronic version of a received fax document, or the like. Document text file 160 is a textual representation of the document image file 150 after having been processed through some type of noisy process, such as OCR or handwriting recognition. Document text file 160 is searchable for instances of a query string. In one embodiment, data stored in document text file 160 may be in ASCII text format, a rich text format, or the like.

Imaging application 120 is a software component with which a user may interact and that is configured to display the document image file 150. In one embodiment, imaging application 120 may be an application configured to display graphical images, such as scanned or faxed documents.

Confusion table 170 is illustrated in detail in FIG. 3 and described below. Briefly described, confusion table 170 includes a table of string-to-string edits that represent likely solutions to errors introduced to output data (OCR output text) during a noisy process (e.g., scanning and OCR).

The present invention allows the document image file 150 to be searched for every instance of a term. The present invention overcomes limitations of the noisy process for converting the document image file 150 to the document text file 160 through the use of confusion table 170. In short, when searching for a query string within the document text file 160, the invention makes use of the confusion table 170, to correct likely errors introduced during the noisy process.

Figure 2:
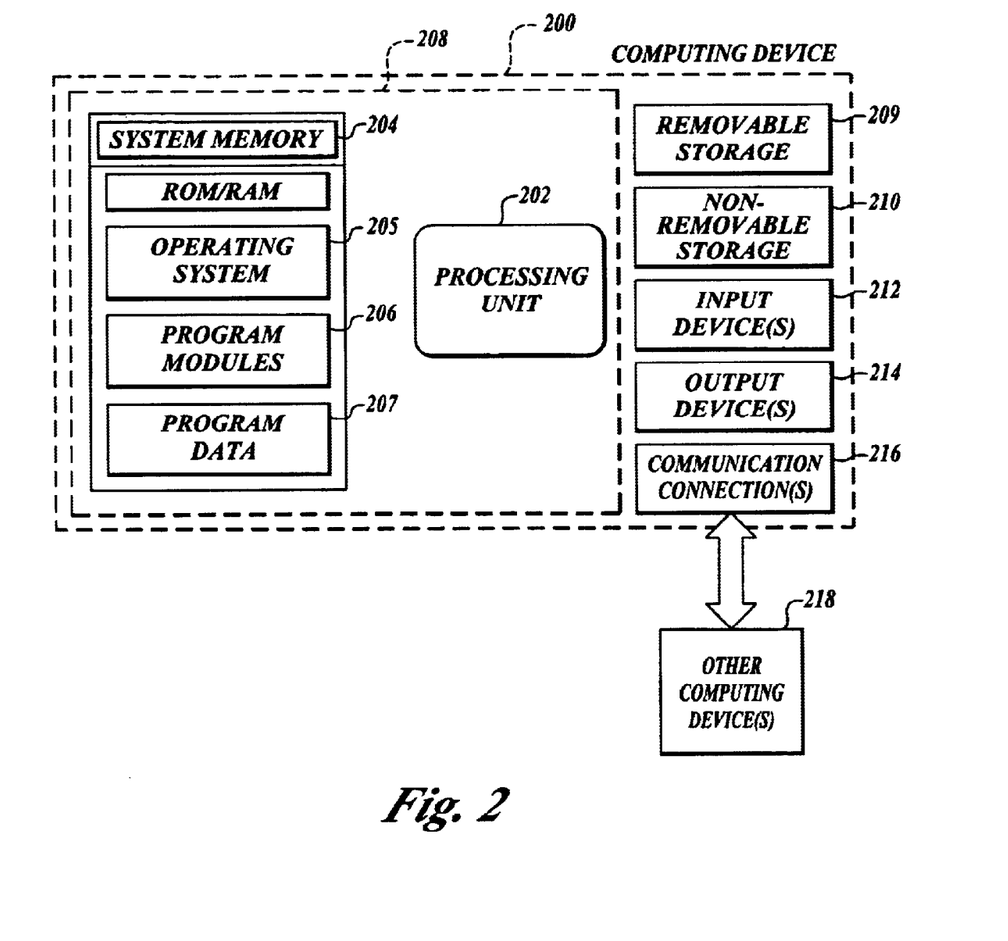
FIG. 2 is a functional block diagram illustrating functional components of a computing device that may be adapted to implement one embodiment of the present invention.

FIG. 2 is a functional block diagram illustrating functional components of a computing device. With reference to FIG. 2, one exemplary system for implementing the invention includes a computing device, such as computing device 200. In a very basic configuration, computing device 200 typically includes at least one processing unit 202 and system memory 204. Depending on the exact configuration and type of computing device, system memory 204 may be volatile (such as RAM), non-volatile (such as ROM, flash memory, etc.) or some combination of the two. System memory 204 typically includes an operating system 205, one or more program modules 206, and may include program data 207. This basic configuration is illustrated in FIG. 2 by those components within dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and nonvolatile, removable and non-removable media implemented in any method or technology for storage of information, such as computer readable instructions, data structures, program modules, or other data. System memory 204, removable storage 209 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 200. Any such computer storage media may be part of device 200. Computing device 200 may also have input device(s) 212 such as keyboard, mouse, pen, voice input device, touch input device, etc. Output device(s) 214 such as a display, speakers, printer, etc. may also be included. These devices are well know in the art and need not be discussed at length here.

Computing device 200 may also contain communication connections 216 that allow the device to communicate with other computing devices 218, such as over a network. Communications connections 216 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Document Imaging System

Figure 3:
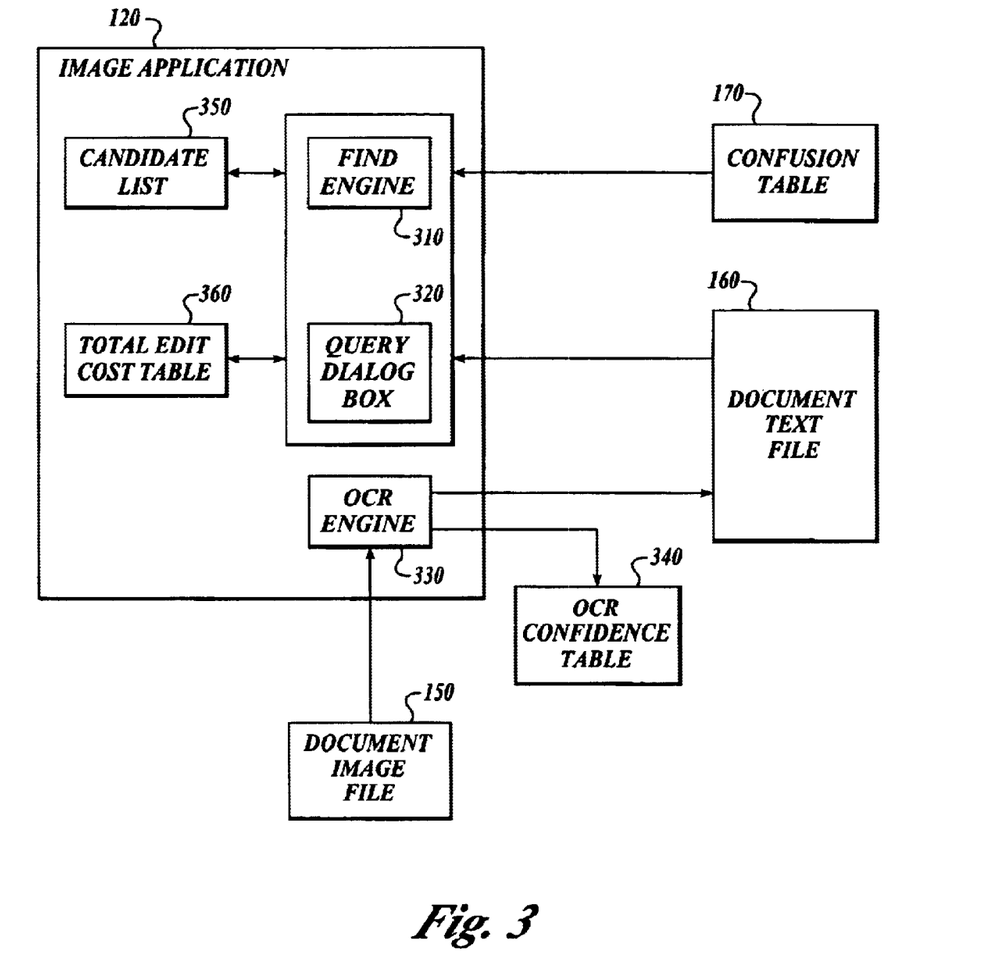
FIG. 3 is a functional block diagram illustrating a document viewer component in accordance with one implementation of the present invention.

FIG. 3 is a functional block diagram illustrating in greater detail the imaging application 120 according to one embodiment of the invention. Imaging application 120 includes find engine 310, query dialog box 320, optical character recognition (OCR) engine 330, and candidate table 350. FIG. 3 further includes confusion table 170, document image file 150, document text file 160, and OCR confidence table 340. Each of these components will be described below, in detail.

Imaging application 120 is a software component organized to control find engine 310, OCR engine 330, as well as other components. Find engine 310 is a software component that controls query dialog box 320 and communicates with confusion table 170, document text file 160, OCR confidence table 340, and candidate table 350. Find engine 310 is configured to perform a search for a query string within the document image file 150.

Query dialog box 320 provides communication between a user and find engine 310. In one embodiment, query dialog box 320 is programmed to prompt the user to identify a query string the user desires to locate throughout document image file 150. The query string requested may include any number of characters including spaces, punctuation, and the like. In another embodiment, the user may input other requested values such as a threshold value $V_{TH}$ (see FIG. 5 and discussion), an error rate K (see FIG. 4 and discussion), and the like.

Optical character recognition (OCR) engine 330 is a software component programmed to take as input the document image file 150. The OCR engine 330 translates the document image file 150 (which is a graphical file) into the document text file 160 (which is a textual file). The process of translating the document image file 150 into the document text file 160 is a noisy process, meaning it is subject to significant error. During the process, the OCR engine 330 generates confidence data that represents a confidence (or probability) that a particular character or word in the document text file 160 is in fact the word having a graphical representation in the document image file 150. In other words, the confidence value quantifies a confidence that characters in the document text file are an accurate representation of the corresponding characters in the document image file.

Candidate list 350 is maintained by find engine 310 and provides storage for candidate data generated by find engine 310. Candidate data is one set of data generated by find engine 310 during the search process detailed below. In one embodiment, candidate data is generated during the first step of the search process.

Confusion table 170 includes a table of string-to-string edits that represents likely solutions to errors introduced during a channel process. In other words, the confusion table associates error strings with correct strings, where the error strings result from the OCR engine 330 misrecognizing the correct strings. Confusion table 170 is produced at some point prior to performing an actual search (e.g., during a training phase). In one embodiment, the process for generating confusion table 170 includes comparing a noisy OCR word to a corresponding "known" text file (e.g., a ground-truth file). The process determines the likelihood that a character or string of characters from the OCR word is the corresponding character or string of characters of the "known" text file.

An example of a sample confusion table 170 appears in TABLE 1 below.

TABLE 1

| s → R | −log p(R\|s) (edit cost) |
|---|---|
| am → arn | 1.074 |
| en → ea | 0.956 |
| en → e, n | 4.400 |
| nt → at | 1.013 |
| end → ead | 0.708 |
| end → eud | 2.508 |
| men → rnea | 0.858 |
| me → me, | 1.211 |

In one embodiment, a set of pairs (S, T) are obtained, where S is a word from the ground-truth file and T is the corresponding noisy OCR word. In one example, a syntactic signature method is used to extract correct matches from the comparison to achieve a set of pairs (S, T) where S is a word from the "known" text file and T is the corresponding noisy OCR word. In one embodiment, for each (S, T) pair, the greatest common substrings between S and T are found, where s represents the original string. The substrings are then used to derive an initial set of possible edits. In this embodiment, the initial set of possible edits is then expanded using up to a given number of characters on either side of the edit. In one example, the initial set of possible edits is expanded up to three (3) characters of context on either side of the edit. In this embodiment, the expansion is performed for both the ground-truth word and the OCR word.

For each edit s→R in the expanded set, the overall frequency of the edit is obtained. Additionally, the frequency of all other edits based on s and the total frequency of s in the corpus (i.e., the ground-truth file) is obtained as well. Values of p(R|s) can then be determined. Values for p(s) may be calculated as well. In one embodiment, these values are obtained via Bayes Theorem. In this embodiment, the value of the posterior probability p(s|R) (i.e., the most useful edits) can be obtained from p(R|s). An edit cost can also be calculated as c=−log p(R|s). The most useful edits, defined as the edits having the highest values of p(R|s)·p(s), can then be determined. In this way, a comparison between a known text (e.g., the ground-truth) and OCR'd text yields a corresponding database of characters and the associated probabilities that a character may represent one or more other characters. This data is then stored in confusion table 170.

In another embodiment, probabilities for other classes of errors may be calculated as well in the training phase. Such possibilities include but are not limited to $P_{insert}$, $P_{delete}$, $P_{subst}$, and represent the probability of an insertion of a character, deletion of a character, and substitution of a character respectively (see FIG. 5 and discussion).

Figure 4:
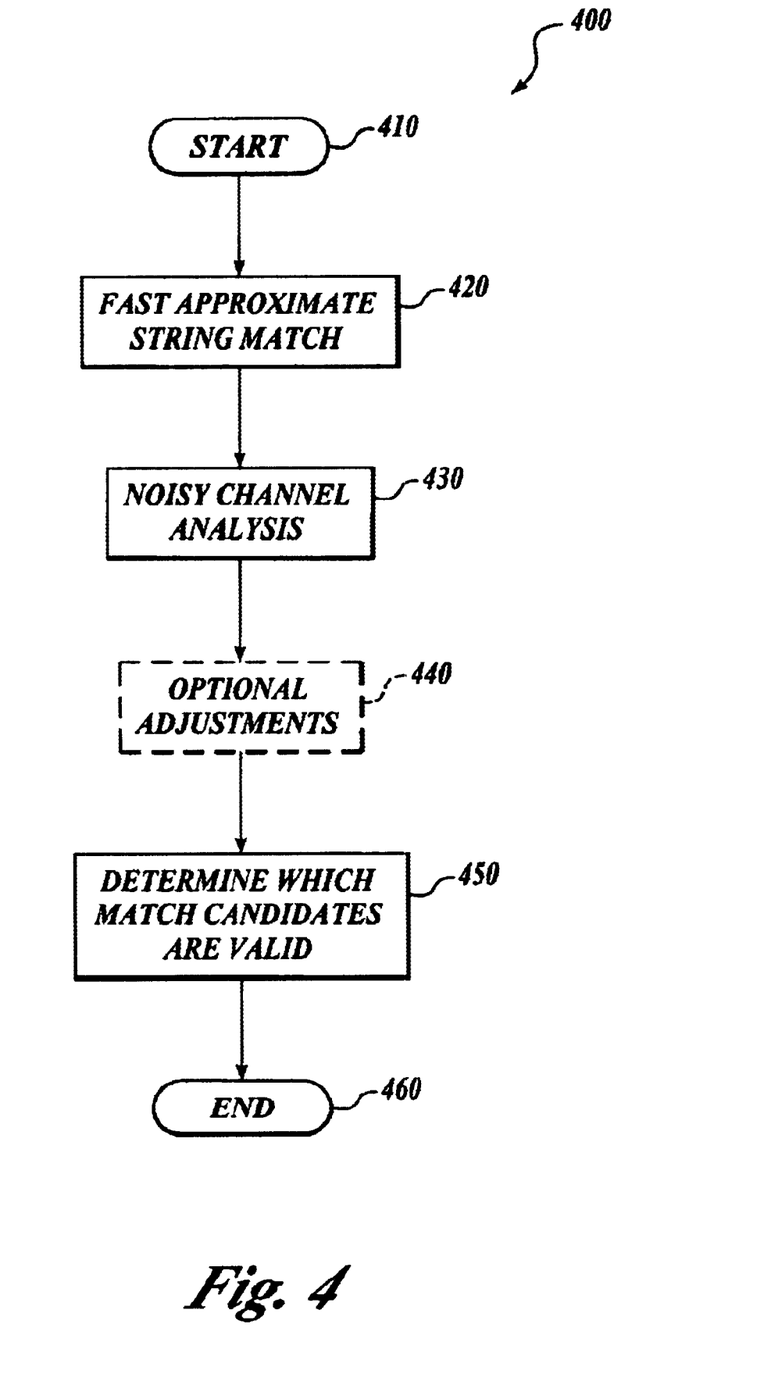
FIG. 4 is a logical flow diagram illustrating a process for string matching under noisy channel conditions, in accordance with one implementation of the present invention.

FIG. 4 is a logical flow diagram generally illustrating a process for string matching under noisy channel conditions. In describing FIG. 4, reference is made to the system described in conjunction with FIG. 3. Process 400 enters at starting block 410, where find engine 310 has received a query string from the user, and OCR engine 330 has created document text file 160 from document image file 150.

The process begins at block 420 where find engine 310 performs a fast approximate string match on data in document text file 160. The fast approximate string match is illustrated in detail in FIG. 5 and described below. Briefly described, and referring to FIG. 3, the fast approximate string match involves find engine 310 utilizing a standard approximating string matching routine on data located in the document text file 160. The standard approximating string matching routine creates candidate data and stores the candidate data in the candidate list 350. Each candidate in the candidate list 350 essentially represents either a direct match or a near match to the query string, where any near match differs from the query string by less than some predetermined threshold.

In one embodiment, candidate data is created using a standard approximate string matching routine with a "generous" maximum error threshold. In one example, the standard approximate string matching routine utilized is a method developed by G. Myers and disclosed in "A fast bit-vector algorithm for approximate pattern matching based on dynamic programming," Proc Combinatorial Pattern Matching 98, 1–13, Springer-Verlag, 1998. In another embodiment, candidate data is created using a standard approximate string matching routine with a "generous" maximum error threshold as detailed in method 420 of FIG. 5.

At block 430, find engine 310 performs a noisy channel cost analysis on candidate data located in candidate list 350. The noisy channel cost analysis is illustrated in detail in FIG. 6 and described below. Briefly described, and referring also to FIG. 3, the noisy channel cost analysis involves find engine 310 comparing each string of candidate data to the query string to identify if a candidate would be an exact match to the query string but for a likely error during the OCR translation process. Each candidate is assigned a cost associated with substitutions that can be made from the confusion table to make the candidate an exact match to the query string. If the cost of a candidate meets a given threshold value $V_{TH}$, that candidate is identified as a match to the query string.

In one embodiment, search engine 310 performs the noisy channel cost analysis and the fast approximate string matching concurrently. In other words, candidate data produced by the fast approximate string match is passed to the noisy channel cost analysis as it is created. In another embodiment, the search engine 310 may complete the fast approximate string matching prior to beginning the noisy channel cost analysis. In this alternative embodiment, the fast approximate string matching completes processing candidate data and stores the candidate data in candidate list 350, and then the noisy channel cost analysis is performed on the candidate list 350

At block 440, find engine 310 may perform optional adjustments to the cost associated with each candidate in the candidate list 350. The optional adjustments are illustrated in detail in FIG. 7 and described below. Briefly described, and also referring to FIG. 3, the optional adjustments may involve performing additional comparisons using additional criteria. The optional adjustments are performed after the noisy channel cost analysis is performed. Optional adjustments may include but are not limited to word heuristics, language models, OCR confidence data, and the like.

Figure 8:
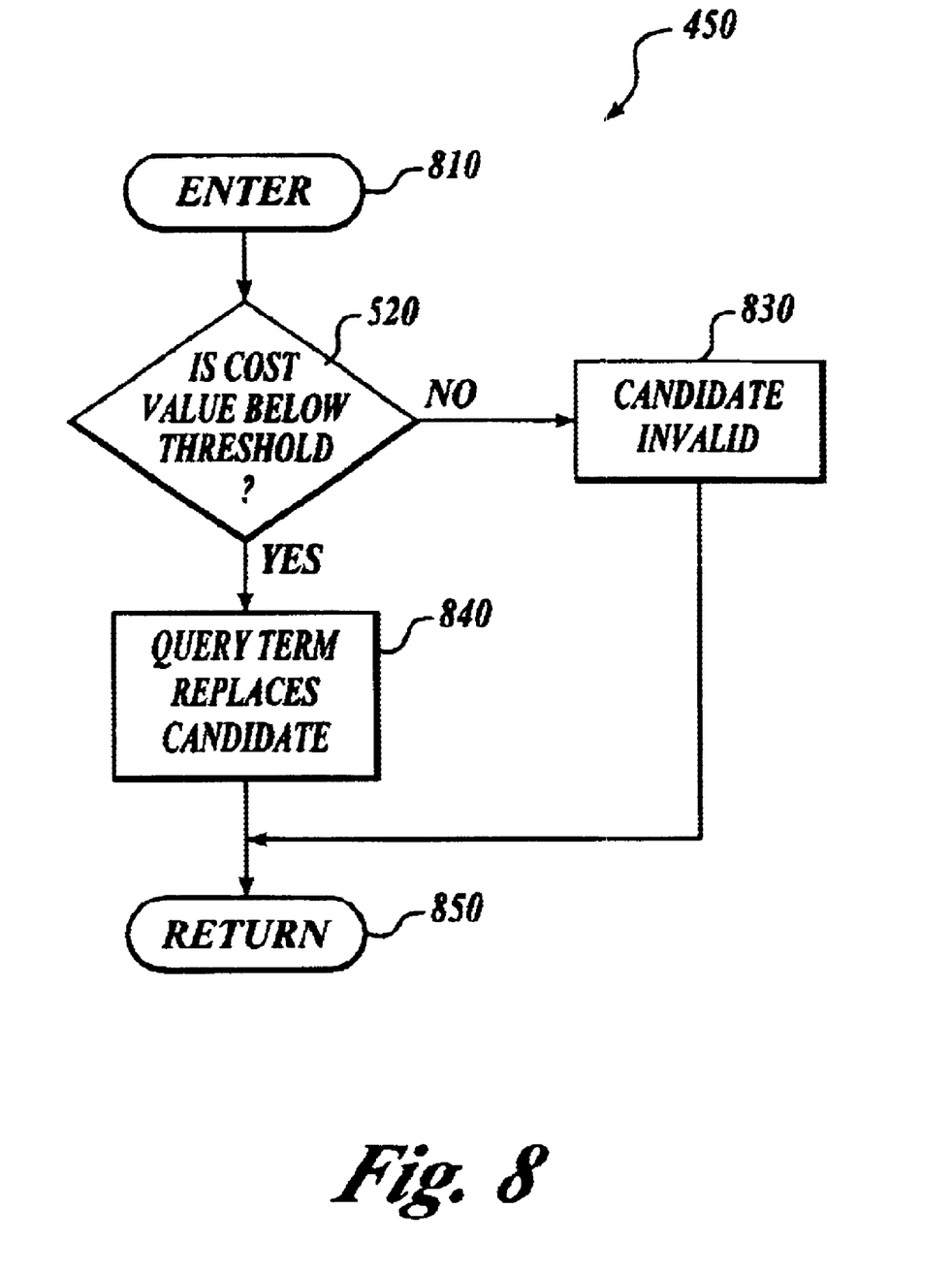
FIG. 8 is a logical flow diagram illustrating a process for determining if a match candidate is a valid match, in accordance with one implementation of the present invention.

At block 450, find engine 310 determines which, if any, candidates satisfy the query string. The determination is illustrated in FIG. 8 and described below. Briefly described, and referring to FIGS. 1 and 3, the determination involves find engine 310 comparing each string of candidate data to a defined threshold value $V_{TH}$. If the comparison meets the threshold, it results in that string of candidate data being identified as matching the query string.

At block 460, processing ends. At this point find engine 310 has identified those strings of candidate data that have met the threshold value $V_{TH}$ and are identified as matching the query string.

Figure 5:
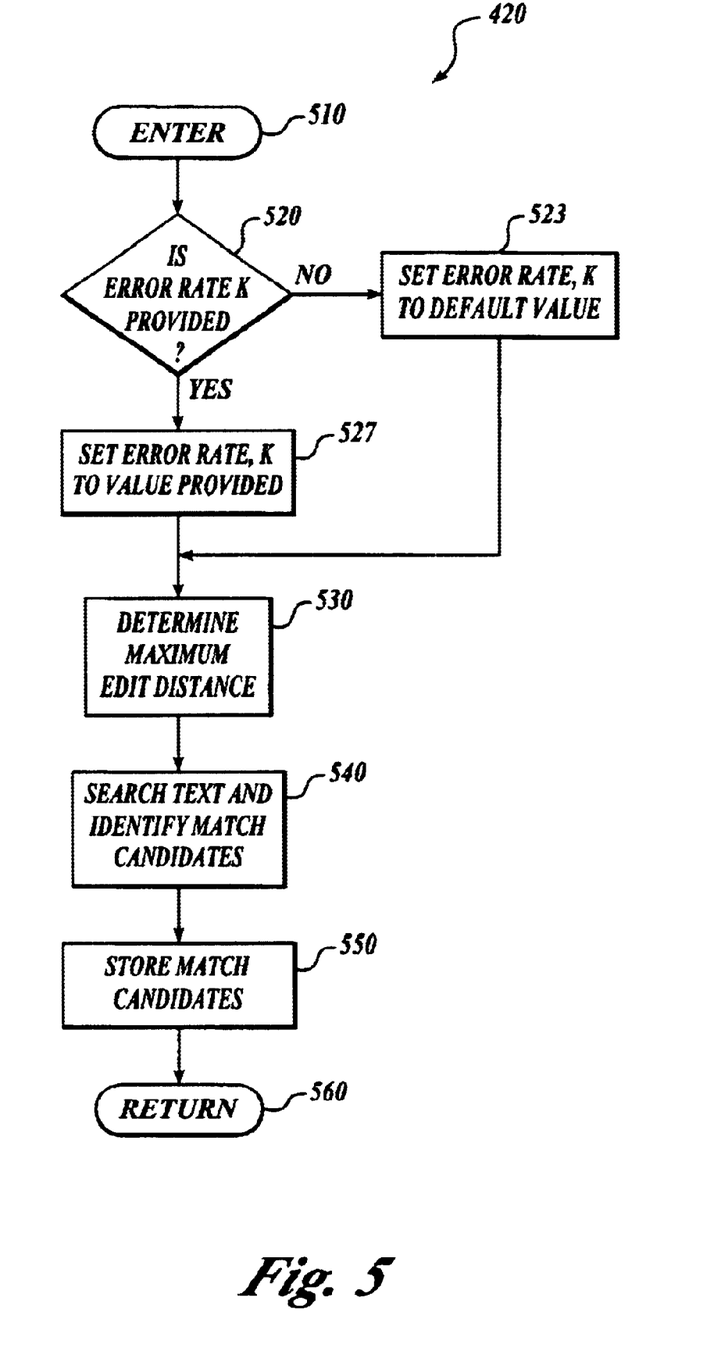
FIG. 5 is a logical flow diagram illustrating a process for pre-filtering initial match candidates, in accordance with one implementation of the present invention.

FIG. 5 is a logical flow diagram illustrating in greater detail a process 420 (FIG. 4) for performing a fast approximate string match (e.g., parsing) on data in document text file 160. In describing FIG. 5, reference is made to the system described in conjunction with FIG. 3. Method 420 enters at starting block 510 where OCR engine 330 has created a document text file 160 from image data in a document image file 150. Additionally, while creating the text data for document text file 160, confidence data is also created for and stored in OCR confidence table 340.

At decision block 520, find engine 310 determines if an error rate K has been provided. In one embodiment, error rate K indicates the average number of errors per query string to be permitted in a match candidate. In this embodiment, an error is considered to be an insertion, deletion, or substitution of a single character relative to the original string. Therefore, larger values of K may increase recall slightly but may use more computation time, due to more candidates being examined. In this embodiment, using a value of K=0 is equivalent to exact matching.

In one example, a value of K=⅝ is used. This value may represent a user-defined value or a default value. In this example, utilizing a value of K=⅝ allows an average of 5 character errors for an 8 letter word. If an error rate K is provided, the process advances to block 527. Alternatively, the process advances to block 523, where the error rate K is set to a default value.

At block 527, the error rate K is set to the value provided. In one embodiment, error rate K is a user-defined term. In this embodiment, query dialog box 320 may allow a user to specify an error rate K rather than using the default value. Other embodiments might allow various error rates K to be used in different situations. For example, an embodiment might allow multiple defaults based on the type of document received, the median of transmission of the document reception, and the like.

At block 530, method 420 determines a maximum edit distance to be used for the fast approximate string match. In one embodiment, the maximum edit distance is equal to the product of the error rate and the length of the query string.

At block 540, find engine 310 searches the document text and identifies match candidates based on a standard approximate string matching routine. In one embodiment, match candidates are those strings that contain enough matching characters to fall within the error rate K threshold. At block 550, find engine 310 stores the match candidates in candidate list 350.

Figure 6:
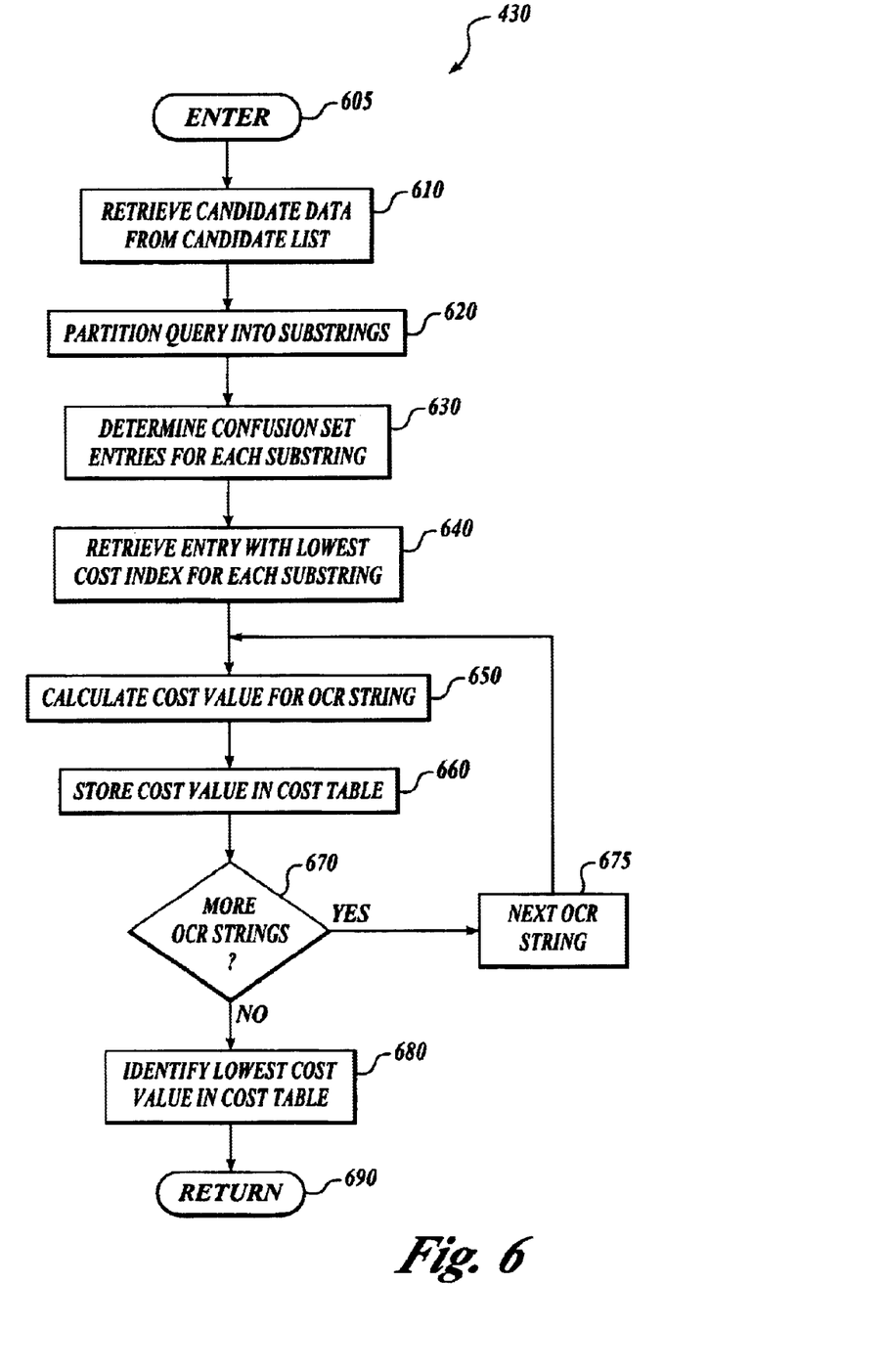
FIG. 6 is a logical flow diagram illustrating a process for noisy channel cost analysis, in accordance with one implementation of the present invention.

FIG. 6 is a logical flow diagram illustrating in greater detail a process for performing a noisy channel cost analysis on candidate data located in candidate list 350. In describing FIG. 6, reference is made to the system and process described in conjunction with FIGS. 1 and 3.

Method 430 enters at starting block 605 where find engine 310 prepares to perform a noisy channel cost analysis on candidate data previously parsed from document text file 160 (see FIG. 5 and discussion). In one example, query dialog box 320 receives a query term "amendment" from the user. In this example, method 430 receives candidate data generated by OCR engine 330, for example the term "arneadme,nt."

The noisy channel cost analysis involves using a set of confusion data of typical string-to-string edits as discussed above. Each string-to-string edit in the set of confusion data has an associated probability p(s|R), where s represents the original string and R represents a corresponding erroneous OCR string partition. In one embodiment, the value of the probability is obtained via Bayes Theorem. In this embodiment, and ignoring the constant denominator, p(s|R) is given by p(R|s)·p(s). Taking the negative logarithm of p(R|s) yields an edit cost c of the string-to-string edit. Given a confusion set C of m entries:

$$\{s_1 \rightarrow R_1, s_2 \rightarrow R_2, \ldots, S_m \rightarrow R_m\}$$

which have corresponding edit costs $$\{c_1, c_2, \ldots, c_m\},$$

a query term/string Q, and a candidate T in the OCR text, the probability that Q matches T can be calculated.

At block 610, find engine 310 retrieves a candidate from the candidate list 350. At block 620 find engine 310 partitions the query string into n substrings $\{Q_1, Q_2, \ldots, Q_n\}$. A substring is a portion of the query string for which there is a corresponding set of characters in the candidate. That is, for each $Q_i$, there is a corresponding set of characters $T_i$ in the candidate data. If there are multiple possibilities of substrings to be partitioned, each of the multiple possibilities is termed an OCR string partition. In one example, the query string "amendment" can be partitioned into several OCR string partitions, such as:

1. am|end|me|nt
2. a|men|d|me|nt

At block 630, find engine 310 determines one or more sets of characters $T_i$ from the candidate where each set of characters is used to compare to each substring of the query string. In one embodiment, find engine 310 utilizes confusion table 170 to identify the sets of characters $T_i$ that qualify. At block 640, find engine 310 retrieves the set of characters $T_i$ with the lowest edit cost for each substring of the query string. In one embodiment, find engine 310 retrieves the set of characters $T_i$ with the lowest edit cost from confusion table 170. Thereafter, one of the following possibilities is satisfied for each $Q_i$:

1. $Q_i$ maps without error to its counterpart $T_i$, with probability $P_{correct}(Q_i)$.
2. $Q_i$ has an entry in the confusion set such that it maps to $T_i$ according to the entry $s_j \rightarrow R_j$, with probability $c_i$.
3. $Q_i$ maps to some set of characters $T_i$, but this mapping is not in the confusion set and therefore is modeled by a series of single character insertions, deletions, or substitutions. The probabilities of these operations may vary for individual characters. In one embodiment, the overall probabilities are denoted as $p_{insert}(Q_i)$, $p_{delete}(Q_i)$, and $p_{subst}(Q_i)$ respectively.

In one example, the following values can be used:

$$p_{insert}(Q_i)=0.1$$

$$p_{subst}(Q_i)=0.1$$

$$p_{delete}(Q_i)=0.01$$

$$p_{correct}(Q_i)=0.9$$

In this example, the set of characters $T_i$ with the lowest edit cost for each substring of OCR string partition 1 (above) retrieved from Table 1 is:

am→arn=1.074 end→ead=0.708 me→me,=1.211 nt→nt=0.105

Additionally, in this example, the set of characters $T_i$ with the lowest edit cost for each substring of OCR string partition 2 (above) retrieved from Table 1 is:

a→a=0.105 men→rnea=0.858 d→d=0.105 me→me,=1.211 nt→nt=0.105

At block 650, find engine 310 calculates a total edit cost $C_1$ for the first OCR string partition. In one embodiment, find engine 310 calculates the total edit cost for the OCR string partition by summing the negative logarithms of the probability that each substring $Q_n$ is the set of characters $T_i$.

The total edit costs $c_i$ can be calculated by identifying the most likely of all possible partitions. The most likely of all partitions is identified by denoting a set of possible partitions Q by Part(Q), assuming the transformations are independent. The result may be expressed as follows:

$$p(Q|T)=\arg\max_{D \in Part(Q)} \prod_{Q(i) \in D} p(Q_i \rightarrow T_i)$$

When the term $p(Q_i \rightarrow T_i)$ is expanded in terms of probability for the possibilities of the above equation, an expression for the total edit cost $C_{Total}$ is as follows:

$$C_{Total}=\arg\min_{D \in Part(Q)} \Sigma_{Q(a) \in D} -\log p_{correct}(Q_a) + \Sigma_{Q(b) \in D} -\log c_b + \Sigma_{Q(c) \in D} -\log p_{insert}(Q_c) + \Sigma_{Q(d) \in D} -\log p_{delete}(Q_d) + \Sigma_{Q(e) \in D} -\log p_{subst}(Q_e).$$

In one example, find engine 310 calculates the total edit cost $C_1$ for OCR string partition 1 as:

$$C_1=-\log p(am \rightarrow arn) - \log p(end \rightarrow ead) - \log p(me \rightarrow me,) - \log p_{correct}(nt \rightarrow nt)$$

therefore, $$C_1=1.074+0.708+1.211+0.105=3.098$$

At block 660, find engine 310 stores the total edit cost $C_1$ for the first OCR string partition. In one embodiment, find engine 310 stores the total edit cost $C_1$ for the first OCR string partition in total edit cost table 360. At decision block 670, find engine 310 determines if there are additional OCR string partitions to calculate the total edit cost $C_m$ for. If there are additional total edit costs $C_m$ to calculate, the process advances to block 675. Alternatively, the process advances to block 680.

At block 675, find engine 310 retrieves the next OCR string partition. In one embodiment, find engine retrieves the lowest edit cost for each substring of the OCR string partition from confusion table 170. The process then advances to blocks 650 and 660 where the total edit cost $C_2$ for the second OCR string partition is calculated and subsequently stored in total edit cost table 360. In one example, find engine 310 calculates the total edit cost $C_2$ for OCR string partition 2 as:

$$C_2=-\log p_{correct}(a \rightarrow a) - \log p(men \rightarrow rnea) - \log p_{correct}(d \rightarrow d) - \log p(me \rightarrow me,) - \log p_{correct}(nt \rightarrow nt)$$

therefore, $$C_1=0.105+0.858+0.105+1.211+0.105=2.384$$

When there are no more OCR string partitions to calculate total edit costs $C_m$ for, the process advances to block 680. At block 680, find engine 310 identifies the lowest total edit cost $C_L$ of the total edit costs $C_m$ produced. In one embodiment, find engine 310 compares each of the total edit costs $C_m$ to each other. In one example, find engine 310 would compare the first total edit cost ($C_1$) with the second total edit cost $C_2$ (3.098 vs. 2.384 respectively). In this example, the second total edit cost $C_2$ would be identified as the lowest total edit cost $C_L$ and returned to the total edit cost table 360.

In another embodiment, block 680 is eliminated and all total edit costs $C_m$ remain in the total edit cost table 360. The process then advances to block 690. At block 690, the process returns to block 430 of method 400 (see FIG. 4 and discussion).

Figure 7:
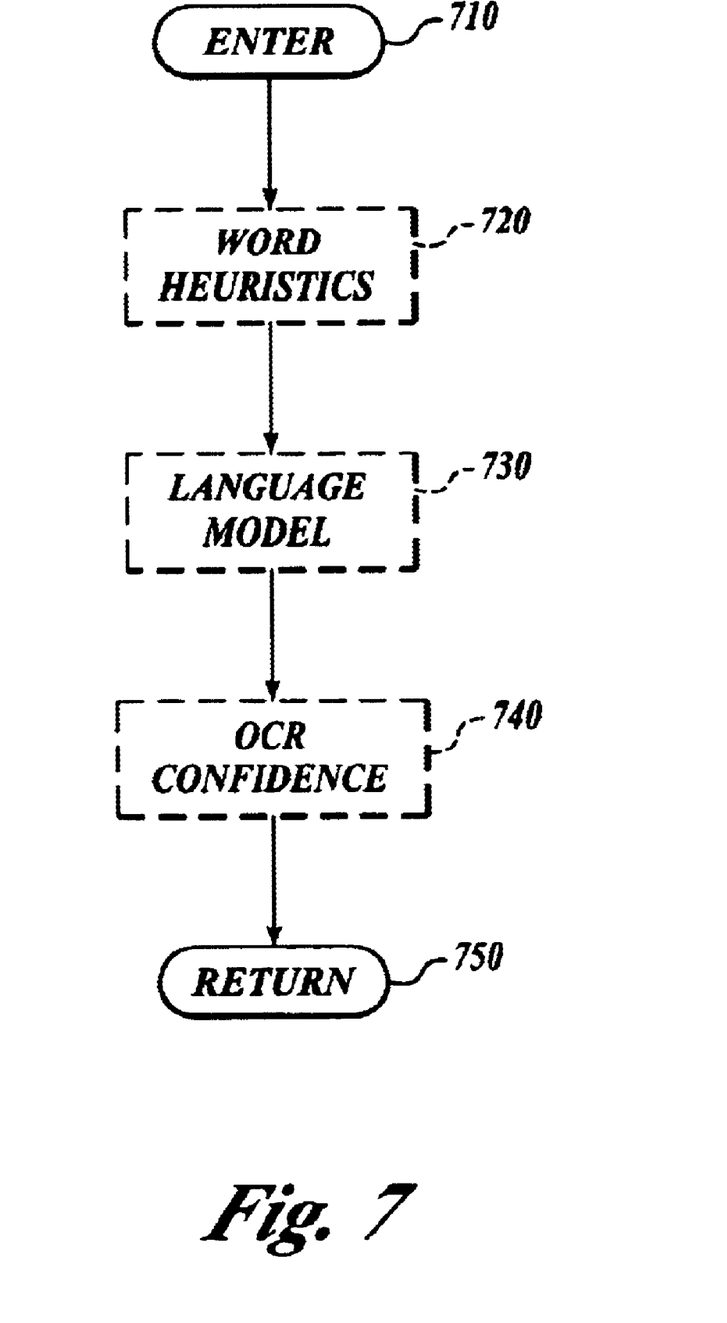
FIG. 7 is a logical flow diagram illustrating an optional process employing an optical character recognition (OCR) confidence table, in accordance with one implementation of the present invention.

FIG. 7 is a logical flow diagram illustrating in greater detail optional processes for performing additional processing on total edit costs $C_m$ calculated using method 430 (see FIG. 6 and discussion). In describing FIG. 7, reference is made to the system and process described in conjunction with FIGS. 1, 3, 4, and 6.

Method 440 enters at starting block 710, where find engine 310 is preparing to perform one or more optional processes on candidate data located in candidate list 350 to refine the edit cost of each candidate. In one embodiment, find engine 310 has just received candidate data and the associated total edit costs $C_m$.

At block 720, find engine 310 performs optional process word heuristics to increase the accuracy of method 400. In one embodiment, optional process word heuristics includes steps that identify position-based probabilities that reflect the importance that a match be close to a complete word or word prefix. In one example, the candidate data may be tested for either punctuation or white-space at the start and end of a match. In this example, the total edit costs $C_m$ might be reduced by 0.25 for a word prefix match. Similarly, the total edit costs $C_m$ might be reduced by 0.50 for an entire word match.

At block 730, find engine 310 performs optional process language models to increase the accuracy of method 400. In one embodiment, optional process language models include steps to calculate a rough confidence estimate based on simple language models. In one example, optional process language models utilizes a frequency table of English bigrams (utilizing other language bigrams if another language were in use) that provide either a "low" or "high" confidence estimate to any query strings containing at least one "rare" bigram or none, respectively.

At block 740, find engine 310 performs optional process OCR confidence data to increase the accuracy of method 400. In one embodiment, optional process OCR confidence data includes steps that may increase edit costs, in the noisy channel model, according to a region's confidence value. In this embodiment, the region's confidence value is based on the word-level confidence data provided from OCR confidence table 340. The OCR confidence data may be produced when OCR engine 330 creates document text file 160 from document image file 150.

In another embodiment, find engine 310 may provide an indeterminate confidence value for a word. In this embodiment, find engine 310 may utilize optional process language model to provide an estimate. In yet another embodiment, optional process OCR confidence data may utilize character-level confidence data. Character-level confidence data may provide an increase in accuracy but with a corresponding increase in file size. At block 750, the process returns to block 440 of method 400 (see FIG. 4 and discussion).

FIG. 8 is a logical flow diagram illustrating a process 450 for determining if a match candidate is a valid match. In describing FIG. 8, reference is made to the system and process described in conjunction with FIGS. 3 and 4. Method 450 enters at block 810 where total edit costs $C_m$ for candidate data have been determined.

At decision block 820, find engine 310 compares each total edit cost $C_m$ value to a threshold value $V_{TH}$. In one example, the threshold value $V_{TH}$ is preset to 0.300. Continuing with the above example, the query string Q is "amendment" that includes nine characters, and assumes that the threshold value $V_{TH}$ is 2.700. In this example, the second total edit cost $C_2$, having a value of 2.384, would be considered a valid match. In this example, the first total edit cost $C_1$, having a value of 3.098, would not be considered a valid match. In another embodiment, the threshold value $V_{TH}$ can be modified by one or more optional adjustments implemented during method 440 of method 400 (see FIGS. 4 and 7 and accompanying discussion).

At block 830, if the candidate data is determined to be an invalid match, the candidate data is returned, along with its associated total edit cost $C_m$, to the candidate list 350 and total edit cost table 360 respectively. The process then advances to block 850.

At block 840, if the candidate data is determined to be a valid match, find engine 310 presents the matching candidate to the user. In one embodiment, each candidate identified as a match to the user's query term is highlighted or otherwise made known to the user. For example, each candidate in the candidate list 350 may be indexed to a location in the document image file 150. Each candidate identified as a match may be presented to the user by "highlighting" the area in the document image file 150 corresponding to the matching candidate. Of course, the matching candidates could be presented to the user as each match is identified, after the matches are identified, or somewhere in between. The process then advances to block 850, where the process returns to block 450 of method 400 (see FIG. 4 and discussion).

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium having computer-executable components for locating a query string in a document image file, comprising:

a search component in communication with an image file and being configured to transform the image file into a textual file, the textual file including textual data corresponding to graphical representations of the textual data within the image file; and a confusion table identifying errors that could occur during the transformation of the image file to the textual file, each error in the confusion table having an associated likelihood that the error would occur, wherein the search component is configured to locate instances of a query string within the textual file by comparing the query string to a candidate string in the textual file and determining a probability that the candidate string matches the query string and using the confusion table.

2. The computer-readable medium of claim 1, wherein the search component further comprises a dialog box component for receiving the query string from a user.

3. The computer-readable medium of claim 1, wherein the search component further comprises a dialog box component for receiving a threshold value that includes a value that must be satisfied to identify the candidate string matches the query string.

4. The computer-readable medium of claim 3, wherein the mechanism includes an optical character recognition engine.

5. The computer-readable medium of claim 3, wherein the mechanism includes a handwriting recognition engine.

6. The computer-readable medium of claim 1, wherein the search component further comprises a dialog box component for receiving an error rate that identifies an average number of errors that are permitted between the query string and any string in the textual file while still considering the string in the textual file the candidate string.

7. The computer-readable medium of claim 1, wherein the search component further comprises a mechanism to transform the image file into the textual file, and wherein that mechanism performs the transformation through a noisy process.

8. The computer-readable medium of claim 1, wherein a recognition engine produces confidence data during the transformation of the image file to the textual file, the confidence data identifying a probability that the textual file is an accurate representation of the image file.

9. The computer-readable medium of claim 1, wherein the identified errors in the confusion table include string-to-string edits corresponding to likely errors in recognizing graphical representations of text.

10. The computer-readable medium of claim 9, wherein the string-to-string edits comprise a table including correct edit strings with each edit string having a corresponding incorrect edit string wherein a difference between the correct edit string and the incorrect edit string is a result of a noisy process for transforming image files to text files, and wherein correct/incorrect edit string pair further includes a probability of occurrence of the difference.

11. The computer-readable medium of claim 1, further comprising a candidate table including candidates, wherein each candidate is generated by a parsing of the text file to identify strings within the textual file that are similar to the query string.

12. The computer-readable medium of claim 11, wherein each candidate differs from the query string by not more than a predetermined factor.

13. A computer-readable medium, having computer executable-instructions for performing steps, comprising:
   receiving a request to locate instances of a query string in a document image file;
   transforming the document image file into a document text file using a recognition process;
   parsing the document text file to identify a candidate data string that differs from the query string by less than a predetermined factor; and
   analyzing the candidate data string to identify a probability that the candidate data string matches the query string.

14. The computer-readable medium of claim 13, wherein parsing the document text file includes performing a fast approximate string match.

15. The computer-readable medium of claim 13, wherein analyzing the candidate data string comprises performing a noisy channel analysis.

16. The computer-readable medium of claim 15, wherein analyzing the candidate data string comprises:
   comparing a portion of the candidate data string to a table associating error strings with correct strings, wherein the error strings result from the recognition process misrecognizing the correct strings; and
   if the portion of the candidate data string corresponds to an error string, determining if replacing the portion with the correct string corresponding to the error string increases the probability that the candidate data string matches the query string, and if so, identifying the candidate data string as a match.

17. The computer-readable medium of claim 16, wherein each error string/correct string pair has an associated probability that describes a likelihood that the correct string was misrecognized as the error string, and wherein determining if replacing the portion increases the probability that the candidate matches the query string is based on the likelihood that the correct string was misrecognized as the error string.

18. The computer-readable medium of claim 16, wherein analyzing the candidate data string further comprises evaluating whether a confidence value associated with the portion of the candidate data string affects the probability that the candidate data string matches the query string, the confidence value quantifying a confidence that characters in the document text file are an accurate representation of the corresponding characters in the document image file.

19. The computer-readable medium of claim 16, wherein analyzing the candidate data string further comprises including word heuristics in the analysis.

20. The computer-readable medium of claim 16, wherein analyzing the candidate data string further comprises including process language models in the analysis.

21. A computer-implemented method for locating strings in a document, comprising:
   receiving a request to locate instances of a query string in a document image file;
   transforming the document image file into a document text file using a recognition process;
   performing a fast approximate string match on the document text file to identify a candidate data string that differs from the query string by less than a predetermined factor; and
   analyzing the candidate data string to identify a probability that the candidate data string matches the query string.

22. The computer-implemented method of claim 21, wherein analyzing the candidate data string comprises:
   comparing a portion of the candidate data string to a confusion table that associates error strings with correct strings, wherein the error strings result from the recognition process misrecognizing the correct strings, and further wherein each error string/correct string pair has an associated probability that describes a likelihood that the correct string was misrecognized as the error string; and
   if the portion of the candidate data string corresponds to an error string, determining if replacing the portion with the correct string corresponding to the error string increases the probability that the candidate data string matches the query string, and if so, identifying the candidate data string as a match.

23. The computer-implemented method of claim 21, wherein analyzing the candidate data string comprises evaluating whether a confidence value associated with the portion of the candidate data string affects the probability that the candidate data string matches the query string, the confidence value quantifying a confidence that characters in the document text file are an accurate representation of the corresponding characters in the document image file.

24. The computer-readable medium of claim 21, wherein analyzing the candidate data string comprises including word heuristics in the analysis.

25. The computer-readable medium of claim 21, wherein analyzing the candidate data string comprises including process language models in the analysis.

* * * * *